United States Patent

Miyago

[11] Patent Number: 6,070,953
[45] Date of Patent: *Jun. 6, 2000

[54] BRAKING SYSTEM FOR A VEHICLE

[75] Inventor: Shouichi Miyago, Toyota, Japan

[73] Assignee: Toyota Jidosha Kabushiki Kaisha, Aichi-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/995,082

[22] Filed: Dec. 19, 1997

[30] Foreign Application Priority Data

Jan. 17, 1997 [JP] Japan .................................. 9-006919

[51] Int. Cl.⁷ .............................. B60L 7/10; B60T 13/74
[52] U.S. Cl. ........................ 303/152; 303/146; 303/186; 188/156; 701/22; 701/70; 701/72
[58] Field of Search ................................ 303/152, 113.5, 303/3, DIG. 3, 112, 190, 20, 146, 147, 148, DIG. 4, 139, 140, 141, 142, 186–189, 155, 169; 188/156, 158, 181 T; 701/22, 81, 70, 72, 83, 84, 71, 85, 90, 91, 92; 477/188; 318/139, 376; 180/165, 65.1–65.8

[56] References Cited

U.S. PATENT DOCUMENTS

| | | | |
|---|---|---|---|
| 5,358,317 | 10/1994 | Cikanek | 303/3 |
| 5,433,512 | 7/1995 | Aoki et al. | 303/152 |
| 5,450,324 | 9/1995 | Cikanek | 303/20 |
| 5,511,859 | 4/1996 | Kade et al. | 303/152 |
| 5,539,641 | 7/1996 | Littlejohn | 303/152 |
| 5,707,115 | 1/1998 | Bodie et al. | 188/158 |
| 5,895,100 | 4/1999 | Ito et al. | 303/152 |
| 5,927,829 | 7/1999 | Saga et al. | 303/152 |

FOREIGN PATENT DOCUMENTS

| | | |
|---|---|---|
| 5-161213 | 6/1993 | Japan . |
| 6-153316 | 5/1994 | Japan . |
| 7-205800 | 8/1995 | Japan . |

*Primary Examiner*—Douglas C. Butler
*Attorney, Agent, or Firm*—Kenyon & Kenyon

[57] ABSTRACT

A braking system for a vehicle is provided. The system includes a hydraulic braking unit that generates a hydraulic braking force and a regenerative braking unit that generates a regenerative braking force regenerating braking energy as regenerative electric power. The system detects a target-braking force required by a driver and controls the hydraulic braking force to the target-braking force. The system controls the regenerative braking force to a first predetermined value while the vehicle is traveling straight. On the other hand, the system controls the regenerative braking force to a second predetermined value, which is smaller than the first predetermined value, while the vehicle is turning.

24 Claims, 4 Drawing Sheets

BRAKING SYSTEM FOR A VEHICLE

BACKGROUND OF THE INVENTION

1. Field of the Invention

The present invention generally relates to a braking system for a vehicle and, more particularly, to a braking system controlling braking force of an electric vehicle.

2. Description of the Related Art

Conventionally, a regenerative braking system provided on an electric vehicle has been known as disclosed in Japanese Laid-open Patent Application No 7-205800. The system has a motor as a power supply for the vehicle. The motor generates traction torque according to electric power supplied to the motor. Further the motor converts torque energy supplied from driving wheels to electric power.

The ability of the motor to act as an alternator depends on the strength of the magnetic field generated inside the motor and speed of a coil moving through the magnetic field. The speed of the coil is proportion to rotational speed of the driving wheels. Accordingly, the generative ability of the motor depends on the strength of the magnetic field and the rotational speed of the driving wheels. The motor changes the strength of the magnetic field according to an operating signal supplied to the motor. Therefore, the generative ability of the motor changes according to the operating signal.

When a driver of the vehicle requires braking force, the system supplies an appropriate hydraulic pressure to each wheel cylinder provided to each wheel and requires the motor to generate appropriate electric power. When the hydraulic pressure is supplied to the wheel cylinders, each wheel generates a braking force according to the hydraulic pressure. Hereinafter, the braking force is referred to as hydraulic braking force.

When the requirement is given to the motor, the motor generates an appropriate electric power alternating torque energy supplied from the driving wheels. The system supplies the electric power to a battery equipped to the vehicle. When the motor generates the electric power, braking torque according to the electric power is exerted on the driving wheels. Therefore, the driving wheels generate a braking force when the motor generates the electric power. Hereinafter the electric power generated by the motor is referred to as regenerative electric power. Further the braking force following to the electric power is referred to as regenerative braking force.

As discussed above, when braking force is required by the driver the system generates the hydraulic braking force at all wheels, generates the regenerative braking force at the braking wheels, and regenerates a part of the braking energy supplying the regenerative electric power to the battery. Accordingly, the system permits a highly energy efficient operation of the vehicle while generating a large braking force.

The energy efficiency of the vehicle is increased, as the regenerative braking force becomes greater. Thus, it is preferable to generate a maximum regenerative braking force when the driver requires a braking force. In the electric vehicle, the maximum regenerative braking force depends on rotational speed of the driving wheels, charging state of the battery and so on. The system calculates the maximum regenerative braking force based on the parameters and requires the motor to generate the maximum regenerative braking force when the driver requires a braking force. Therefore, according to the system, it is possible to make the vehicle highly energy efficient.

A braking characteristic of a vehicle is greatly affected by a ratio of the braking force of driving wheels and following wheels. When a braking force proportion to pedal-pressing force is generated at both of the driving wheels and the following wheels, a preferable braking characteristic is obtained. Hereinafter, the braking force, which is generated at each wheel and makes the braking characteristic preferable, is referred to as ordinary braking force.

The braking system discussed above generates the hydraulic braking force and the regenerative braking force at the driving wheels. Thus, the driving wheels generate a larger longitudinal force than the following wheels. The wheels generate a large lateral force, as the longitudinal force decreases. Therefore, the system controls the hydraulic braking force of the following wheels as the ordinary braking force and the hydraulic braking force of the driving wheels to a value obtained by subtracting the maximum regenerative braking force from the ordinary braking force. According to the control discussed above enough lateral force is obtained at both of the driving wheels and the following wheels for generating the maximum regenerative braking force.

However, in some cases, the maximum regenerative braking force is rapidly reduced according to the change of state of the vehicle. More particularly, in a case where the battery becomes fully charged, during the time regenerative electric power is supplied to the battery, for example, the maximum regenerative braking force is reduced rapidly. Further, in a case where the rotational speed of the driving wheels decreases, when the regenerative electric power is supplied to the battery, for example, the maximum regenerative braking force is reduced rapidly.

When the maximum regenerative braking force is reduced rapidly, the braking force of the driving wheels becomes much smaller than the braking force of the following wheels, until the reduced amount of the maximum regenerative braking force is taken up by the hydraulic braking force of the driving wheels. Therefore, total braking force exerted on the vehicle becomes momentarily lower than the braking force required by the driver.

As discussed above, the conventional braking system has some possibility of reducing the braking characteristic of the vehicle momentarily, while being useful to generate appropriate braking force at both of the driving wheels and the following wheels, thereby making the vehicle highly energy efficient.

SUMMARY OF THE INVENTION

It is a general object of the present invention to provide a novel and useful braking system for a vehicle.

A more specific object of the present invention is to provide a braking system for a vehicle which is highly energy efficient and provides an appropriate braking characteristic for the vehicle.

The above-mentioned objects of the present invention are achieved by a braking system for a vehicle. The system includes a hydraulic braking unit that generates a hydraulic braking force; a regenerative braking unit that generates a regenerative braking force regenerating braking energy as regenerative electric power; a target-braking force detector that detects a target-braking force required by a driver; a turning detector that determines whether the vehicle is turning; a first regenerative controller that controls the regenerative braking force to a first predetermined value while the vehicle is traveling straight; a second regenerative controller that controls the regenerative braking force to a second predetermined value, which is smaller than the first predetermined value while the vehicle is turning; and a brake actuator which regulates the hydraulic braking force to the target-braking force.

In the system of the present invention, the system generates a regenerative braking force that is added to the hydraulic braking force. The regenerative braking force is controlled to a first predetermined value, namely, a large value when the vehicle is traveling straight. Energy efficiency of the vehicle increases, as the system generates a large regenerative braking force. Therefore, according to the system, it is possible to make the vehicle highly energy efficient while the vehicle is traveling straight.

The regenerative braking force is controlled to a second predetermined value, namely, a small value when the vehicle is turning. Accordingly, a longitudinal force of wheels decreases when the vehicle is turning as compared to when the vehicle is traveling straight. Lateral force that the wheels can generate increases as the longitudinal force decreases. Moreover, cornering stability of the vehicle increases as the wheels generate a larger lateral force. Therefore, the system gives the vehicle stable cornering ability.

In the system of the present invention, the hydraulic braking force provides the target-braking force. Therefore, according to the system, at least a target-braking force is provided even when the regenerative braking force disappears. Accordingly, the system prevents the braking force exerted on the vehicle from decreasing rapidly following disappearance of the regenerative braking force.

Other objects and further feature of the present invention will become more apparent from the following detailed description when read in conjunction with the accompanying drawings.

DESCRIPTION OF THE PREFERRED EMBODIMENTS

In the following, a principle and an embodiment of the present invention will be described with reference to the accompanying drawings.

Figure 1:
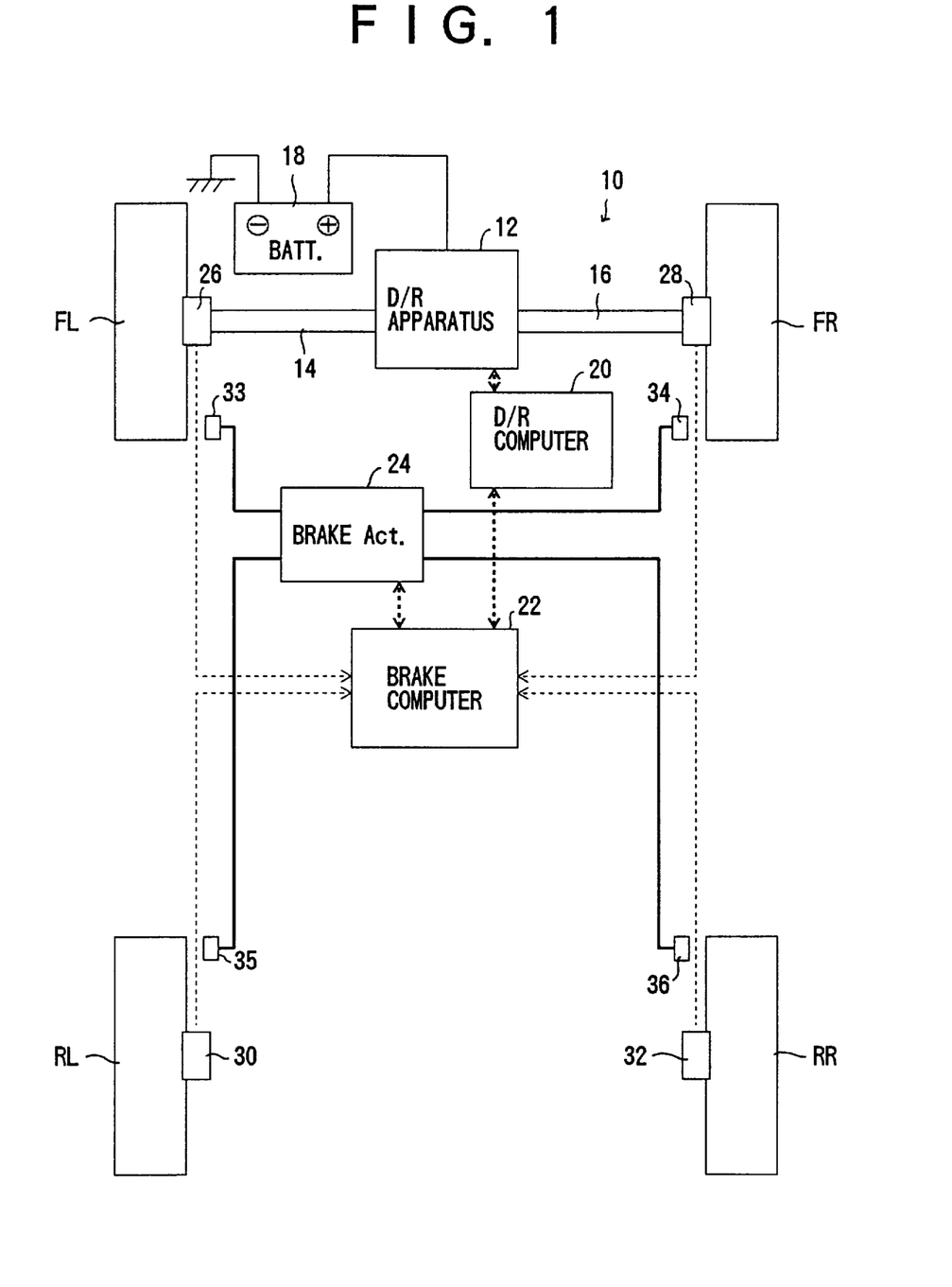
FIG. 1 is a system diagram of an embodiment of the present invention.

FIG. 1 shows a system diagram of an embodiment of a braking system 10 according to the present invention. The braking system 10 has a driving/regenerating apparatus 12 (D/R apparatus 12). Drive shafts 14,16 are connected to the D/R apparatus 12. The drive shafts 14,16 are connected to a front left wheel (FL) and a front right wheel (FR), respectively.

The D/R apparatus consists of a motor or a motor and an engine. In the present embodiment, the FL and the FR are driving wheels, and a rear left wheel (RL) and a rear right wheel (RR) are following wheels. Driving force generated by the motor or the engine of the D/R apparatus 12 is exerted on the FL and the FR, on the driving wheels, through the driving shafts 14,16.

A battery 18 is electrically connected to the motor of the D/R apparatus 12. The motor generates driving torque in accordance with an electric power supplied from the battery 18, and regenerates electric power when rotation torque is input from the driving shafts 14,16. A magnetic field generator and a coil are provided inside the motor. The magnetic field generator generates a magnetic field in accordance with an operating signal supplied to the motor. The coil rotates inside the magnetic field when the FL and the FR are used as the driving wheels and rotate.

The ability of the motor to generate electric power depends on the strength of the magnetic field generated by the magnetic field generator and rotational speed of the coil. The rotational speed of the coil is proportion to the wheel speed VWFL, VWFR of the FL and the FR. Therefore, the electric power regenerated by the motor changes following a change of the operating signal regulating the strength of the magnetic field and a change of the rotational speed of the FL and the FR.

Regenerative braking force is exerted on the FL and the FR when the D/R apparatus 12 regenerates the electric power. The regenerative braking force reduces the rotational speed of the FL and the FR. The regenerative braking force corresponds to the electric power regenerated by the D/R apparatus 12. Thus, the regenerative braking force corresponds to the operating signal and the rotational speed of the FL and the FR.

The D/R apparatus 12 has a driving/regenerating computer 20 (D/R computer 20). The D/R computer 20 is electrically connected to the D/R apparatus 12. The D/R computer 20 supplies the operating signal, which regulates the strength of the magnetic field inside the motor. Further, the D/R computer 20 receives a signal, which corresponds to a charging state of the battery 18.

A brake computer 22 is electrically connected to the D/R computer 20. The system 10 of the present embodiment generates regenerative braking force at the FL and the FR; namely, at the driving wheels. The system 10 also generates hydraulic braking force at all wheels by supplying hydraulic pressure to the wheel cylinders 26, 28, 30 and 32 that are provided, respectively, to each wheel. The brake computer 20 calculates target-hydraulic braking force and target-regenerative braking force independently.

When the brake computer 22 calculates the target-regenerative braking force, the brake computer 22 supplies a regenerative brake-requiring signal according to the target-regenerative braking force to the D/R computer 20. The D/R computer 20 generates an operating signal that is supplied to the D/R apparatus 12 based on the regenerative brake-requiring signal. As a result, braking torque that generates the target-regenerative braking force is exerted on the FL and the FR and regenerative electric power is supplied to the battery 18 from the D/R apparatus 12.

A brake actuator 24 is electrically connected to the brake computer 22. The brake actuator 24 has a pressure sensor that generates a signal corresponding to hydraulic pressure generated by a master cylinder, more particularly, a signal corresponding to pedal pressing force generated by a driver. The signal of the pressure sensor is supplied to the brake computer 22. The brake computer 22 calculates the target-hydraulic braking force based on the output signal of the pressure sensor and supplies an operating signal corresponding to the target-hydraulic braking force to the brake actuator 24. The brake actuator 24 generates hydraulic pressure corresponding to the operating signal supplied thereto.

The wheel cylinders 26, 28, 30 and 32 are connected to the brake actuator 24. The brake actuator 24 supplies appropriate hydraulic pressure corresponding to the operating signal, namely, appropriate hydraulic pressure that generates the target-hydraulic braking force to the wheel cylinders 26, 28, 30 and 32.

Wheel speed sensors 33, 34, 35 and 36 are provided to each of wheels FL, FR, RL and RR, respectively. The wheel speed sensors 33, 34, 35 and 36 generate pulse signals having a cycle corresponding to the wheel speed of respective wheels. The brake computer 22 receives the signals of the speed sensor 33, 34, 35 and 36 and calculates the wheel speed, of the wheels.

As discussed above, the regenerative braking force generated by the D/R apparatus 12 depends on the wheel speed VWFL, VWFR of the FL and the FR, and the operating signal supplied to the motor of the D/R apparatus 12. In this case, the wheel speed VWFL, VWFR regulate the maximum regenerative braking force that the system 10 of the present embodiment can generate. Further, as discussed above, the regenerative electric power that the D/R apparatus 12 supplies to the battery 18 corresponds to the regenerative braking force. Therefore, the regenerative braking force must be regulated so that regenerative electric power exceeding chargeable capacity of the battery 18 is not generated.

A signal corresponding to a charging state of the battery 18 is supplied to the brake computer 22 through the D/R computer 20. The brake computer 22 detects the charging state of the battery 18 based on the signal and detects the wheel speed VWFL, VWFR based on the output signals of the wheel speed sensors 33, 34. Further, the brake computer 22 calculates the maximum regenerative braking force based on the charging state of the battery 18 and the wheel speed VWFL, VWFR.

Braking energy of the vehicle is regenerated more efficiently as the regenerative braking force generated by the system 10 is greater. Accordingly, it is preferable to generate the maximum regenerative braking force in all cases where braking force is required to make the vehicle highly energy efficient.

However, lateral force of a wheel decreases as the wheel generates a larger longitudinal force, namely, a larger braking force. Accordingly, cornering stability of the vehicle increases, as the braking force decreases. Therefore, it is better to control the regenerative braking force so that it is less than the maximum regenerative braking force when the vehicle is turning.

The system 10 of the present embodiment detects turning status of the vehicle based on a difference of the wheel speed of left wheels and right wheels, more particularly, based on $\Delta VR=|VWRL-VWRR|$ OR $\Delta VF=|VWFL-VWFR|$. The system 10 determines that the vehicle is traveling straight when the difference of the wheel speed is less than a predetermined value. Further, the system 10 determines that the vehicle is turning more rapid, as the difference of the wheel speed increases.

The system 10 of the present embodiment has a feature of where making the target-regenerative braking force correspond to the maximum regenerative braking force when the vehicle is traveling in a straight line. The system 10 also has a feature of where making the target-regenerative braking force smaller as the turning status of the vehicle increases. In the following, procedures executed by the system 10 for obtaining the featured functions will be described with reference to FIG. 2, FIG. 3 and FIG. 4.

Figure 2:
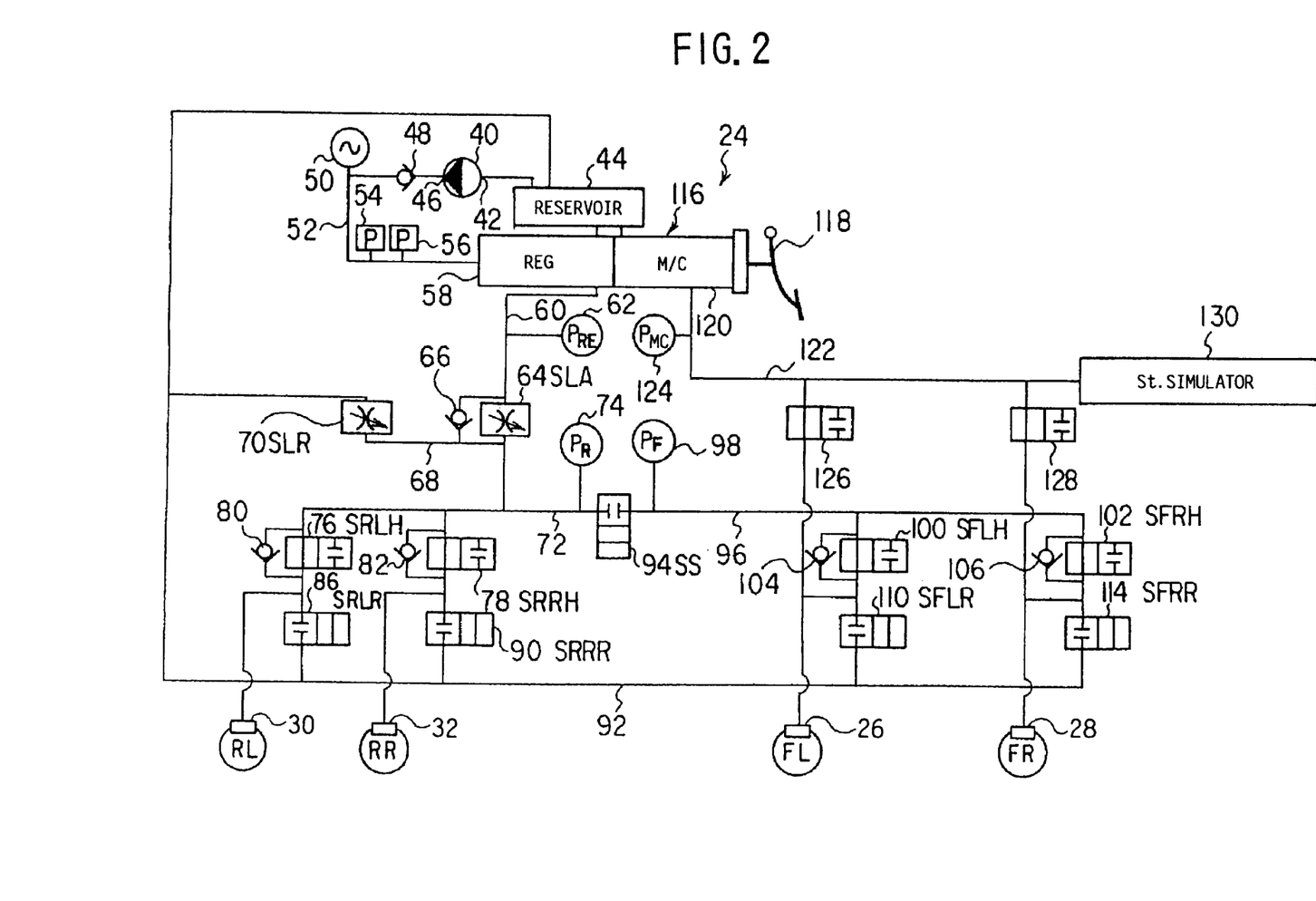
FIG. 2 is a structural diagram of a brake actuator shown in FIG. 1.

FIG. 2 shows structural diagram of the brake actuator 24. As shown in FIG. 2 the brake actuator 24 has a pump unit 40. The pump unit 40 has a motor as a driving source thereof. The inlet 42 of the pump unit 40 is connected to a reservoir tank 44. The outlet 46 of the pump unit 40 is connected to an accumulator 50 through a check valve 48.

The accumulator 50 is connected to a high-pressure passage 52. Pressure switches 54, 56 are provided to the high-pressure passage 52. The pressure switch 54 output an on signal when pressure inside the high-pressure passage 52 (accumulator pressure PACC) exceeds a predetermined maximum value. On the other hand, the pressure switch 56 output an on signal when the accumulator pressure PACC is less than a predetermined minimum value. The pump unit 40 starts operating when the pressure switch 56 output the on signal after the accumulator pressure PACC becomes less than the minimum value. The pump unit 40 remains operating until the pressure switch 54 output the on signal after the accumulator pressure PACC becomes more than the maximum value. As a result, the accumulator pressure PACC is always kept between the maximum value and the minimum value.

The high-pressure passage 52 is connected to a regulator 58. The regulator 58 is connected to the reservoir tank 44 and a main hydraulic passage 60. The regulator generates regulator pressure PREG reducing the accumulator pressure PACC and output the regulator pressure PREG to the main hydraulic passage 60.

A pressure sensor 62 sensing the regulator pressure PREG and a linear addition solenoid 64 (SLA 64) are provided to the main hydraulic passage 60. The pressure sensor 62 supplies an output signal thereof to the brake computer 22. The brake computer 22 detects the regulator pressure PREG based on the output signal.

The SLA 64 is a linear control valve that controls the amount of brake fluid passing through the main hydraulic passage 60. The SLA 64 changes the amount based on an operating signal supplied from the brake computer 22. A check valve 66 is provided to the main hydraulic passage 60 in parallel with the SLA 64. The check valve 66 allows brake fluid to flow from a low side of the SLA 64 to the regulator 58.

The low side of the SLA 64 is connected to a reduction passage 68. The reduction passage 68 is connected to the reservoir tank 44 through a linear reduction solenoid 70 (SLR 70). The SLR 70 is a linear control valve that controls the amount of brake fluid flowing from the reduction passage 68 toward the reservoir tank 44. The SLR 70 changes the amount based on an operating signal supplied from the brake computer 22.

The low side of the SLA 64 is also connected to a rear hydraulic passage 72. A pressure sensor 74 is provided to the rear hydraulic passage 72. The pressure sensor 74 outputs a signal corresponding to pressure inside the passage 72. The pressure sensor 74 supplies the output signal to the brake computer 22. The brake computer 22 detects the pressure inside the passage 72 based on the signal of the pressure sensor 74.

The rear hydraulic passage 72 is connected to a rear left holding solenoid 76 (SRLH 76) and a rear right holding solenoid 78 (SRRH 78). Further, the rear hydraulic passage 72 is connected to check valves 80, 82 that allow a stream of fluid flowing from the low side of the SRLH 76 and the SRRH 78 to the rear hydraulic passage 72. The SRLH 76 and the SRRH 78 are two-position solenoid valves that are controlled by the brake computer 22. The SRLH 76 and the SRRH 78 normally remain in the open state and change to the closed state when receiving an operating signal.

The low side of the SRLH 76 is connected to a wheel cylinder 30 of the RL and a rear left reduction solenoid 86

(SRLR 86). On the other hand, the low side of the SRRH 78 is connected to a wheel cylinder 32 of the RR and a rear right reduction solenoid 90 (SRLR 90). The SRLR 86 and the SRRR 90 are two-position solenoid valves that are controlled by the brake computer 22. The SRLR 86 and the SRRR 90 normally remain in the closed state and change to the open state upon receiving an operating signal. The SRLR 86 and the SRRR 90 are connected to a low-pressure passage 92 leading to the reservoir tank 44.

The rear hydraulic passage 72 is connected to a separating solenoid 94 (SS 94). Further, the SS 94 is connected to a front hydraulic passage 96. The SS 94 is a two-position solenoid valve that is controlled by the brake computer 22. The SS 94 normally remains in the closed state and changes to the open state receiving an operating signal.

A pressure sensor 98 is provided to the front hydraulic passage 96. The pressure sensor 98 output a signal corresponding to pressure inside the front hydraulic passage 96. The pressure sensor 98 supplies the signal to the brake computer 22. The brake computer 22 detects the pressure inside the front hydraulic passage 96 based on the signal.

The front hydraulic passage 96 is connected to a front left holding solenoid 100 (SFLH 100) and a front right holding solenoid 102 (SFRH 102). Further, the front hydraulic passage 96 is connected to check valves 104, 106 that allow a stream of fluid flowing from the low side of the SFLH 100 and the SFRR 102 to the front hydraulic passage 72. The SFLH 100 and the SFRH 102 are two-position solenoid valves that are controlled by the brake computer 22. The SFLH 100 and the SFRH 102 normally remain in the open state and change to the closed state receiving an operating signal.

The low side of the SFLH 100 is connected to a wheel cylinder 26 of the FL and a front left reduction solenoid 110 (SFLR 110). On the other hand, the low side of the SFRH 102 is connected to a wheel cylinder 28 of the FR and a front right reduction solenoid 90 (SFLR 114). The SFLR 110 and the SFRR 114 are two-position solenoid valves that are controlled by the brake computer 22. The SFLR 110 and the SFRR 114 normally remain in the closed state and change to the open state upon receiving an operating signal. The SFLR 110 and the SFRR 114 are connected to a low-pressure passage 92 leading to the reservoir tank 44.

The system has a master cylinder 116. A brake pedal 118 is connected to the master cylinder 116. A hydraulic chamber 120 is provided inside the master cylinder 116. The reservoir tank 44 and a master pressure passage 122 are connected to the master cylinder 116. The reservoir tank 44 is open to the hydraulic chamber 120 only when the brake pedal is released. The master pressure passage 122 is always open to the hydraulic chamber 120 regardless of the state of the brake pedal 118.

A pressure sensor 124, which detects pressure inside the master pressure passage 122, namely, master cylinder pressure PM/C is provided to the master pressure passage 122. The pressure sensor 122 supplies the output signal to the brake computer 22. The brake computer 22 detects the PM/C based on the signal of the pressure sensor 122.

The master pressure passage 122 is connected to a first master-cut solenoid 126 (SMC1 126) and a second master-cut solenoid 128 (SMC2 128). The low side of the SMC1 126 is connected to the wheel cylinder 26 of the FL. On the other hand, the low side of the SMC2 128 is connected to the wheel cylinder 28 of the FR.

The SMC1 126 and the SMC2 128 are two-position solenoid valves that are controlled by the brake computer 22. The SMC1 126 and the SMC2 128 normally remain in the open state and change to the closed state upon receiving an operating signal. The brake computer 22 output the operating signal to the SMC1 126 and the SMC2 128 after the brake pedal 118 is operated. Thus, master cylinder pressure PM/C does not reach the wheel cylinders 26, 28 when the brake pedal 118 is released.

A brake stroke simulator 130 is provided to the master pressure passage 122. Brake fluid flowing out from the master cylinder 116 flows into the brake stroke simulator 130 when the PM/C increases following operation of the brake pedal 118. On the other hand, the brake fluid inside the brake simulator 130 flows into the master cylinder 116 when the PM/C decreases after the brake pedal 118 is released. In the system 10, the brake stroke simulator 130 allows the brake pedal 118 to stroke appropriately under a situation where both of the SMC1 126 and the SMC2 128 remain in the closed state.

Figure 3:
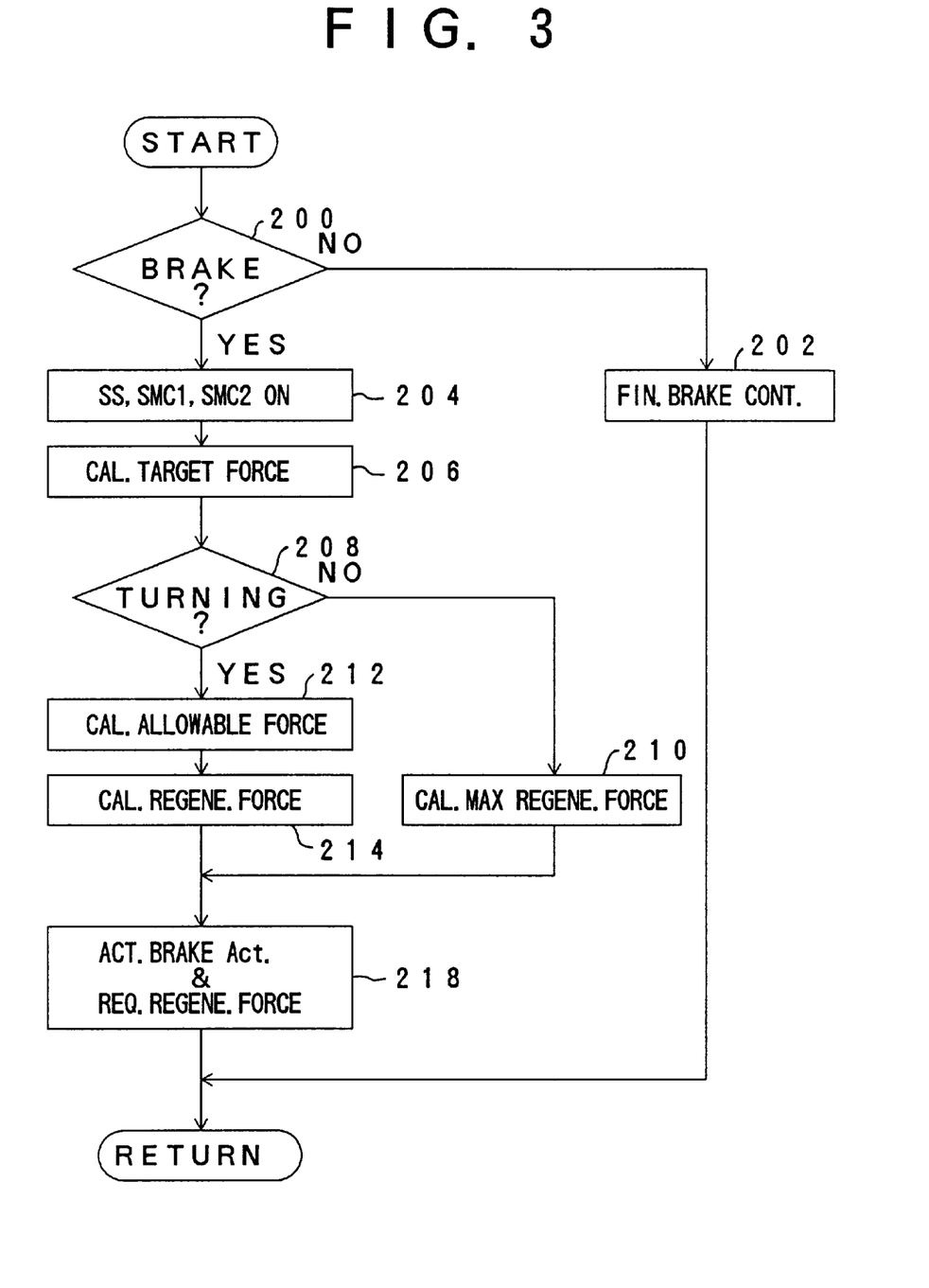
FIG. 3 is a flowchart of a routine executed by a brake computer shown in FIG. 1.

FIG. 3 shows a flowchart of a routine executed by the brake computer 22 to provide the featured functions of the system 10. The routine shown in FIG. 3 is an interrupting routine, which starts repeatedly at predetermined times. In this routine, step 200 is executed first.

In step 200, it is determined whether the driver is executing a braking operation. In this step 200, it is determined that the braking operation is being executed when the pressure sensor 124 detects master cylinder pressure PM/C exceeding a predetermined value. If it is determined that the braking operation is not being executed, the routine proceeds to step 202.

In step 202, procedures for finishing brake control are executed. More particularly, procedures for making all solenoid valves of the system 10 to be in an off state (the state shown in FIG. 2), for making the SLA 64 to be in a fully closed state, for making the SLR 70 to be in a fully opened state, and, for stopping the operating signal requiring the D/R computer 20 to generate the regenerative braking force are executed. When the procedures of step 200 are finished, the routine is finished.

In this embodiment, if it is determined that the braking operation is executed in the above step 200, the routine proceeds to step 204.

In step 204, procedures for making the SS 94, the SMC1 126 and the SMC2 128 to be in an on state are executed. When the procedures are finished, the front hydraulic passage 96 will be open to the rear hydraulic passage 72 through the SS 94, and the wheel cylinders 26, 28 will be cut out from the master pressure passage 122. When the procedures are finished, the routine proceeds to step 206.

In step 206, the target-hydraulic braking force is calculated based on the master cylinder pressure PM/C detected by the pressure sensor 124. The target-hydraulic braking force is a braking force, which should be provided by supplying a hydraulic pressure that is predetermined times higher than the PM/C to all wheel cylinders. When the calculation of the target-hydraulic pressure is finished, the routine proceeds to step 208.

In step 208, it is determined whether the vehicle is turning. The vehicle is turning in a case where the difference of rotational speed of the left wheels and the right wheels, namely, $\Delta VF=|VWFL-VWFR|$ or $\Delta VR=|VWRL-VWRR|$ exceeds a predetermined value. If it is determined that the vehicle is not turning, the routine proceeds to step 210.

In step 210, the maximum regenerative braking force is calculated based on the charging state and the wheel speed of the FL and the FR used as the driving wheels. In this embodiment, the maximum regenerative braking force is the largest regenerative braking force that the system 10 can generate without excessively charging the battery 18. When the calculation is finished, the routine proceeds to step 218.

In step 218, procedures for actuating the brake actuator 24 and requiring the regenerative braking force are executed. More particularly, in this step 218, the SLA 64 and the SLR 70 of the brake actuator 24 are controlled so that the hydraulic braking force of the vehicle corresponds to the target-hydraulic braking force calculated in above step 206. Further, in this step 218, an operating signal requiring the maximum regenerative braking force is supplied to the D/R computer 20. When the procedures are finished, the routine will be finished.

According to the procedures discussed above, almost the same hydraulic pressure is supplied to both front side wheel cylinders 26, 28 and rear side wheel cylinders 30, 32. Therefore, according to the procedures discussed above, almost the same hydraulic braking force will be generated at the front wheels FL, FR and the rear wheels RL, RR. Further, according to the procedures discussed above, the maximum regenerative braking force is generated at the front wheels FL, FR in addition to the hydraulic braking force. In this case, the braking force of the front wheels FL, FR becomes larger than that of the rear wheels RL, RR by almost the maximum regenerative braking force.

The system 10 of the present embodiment can control the hydraulic braking force of the front wheels FL, FR and the hydraulic braking force of the rear wheels RL, RR independently, controlling the front side two-position solenoids (SFLH 100, SFRH 102, SFLR 110 and SFRR 114) and the rear side two-position solenoids (SRLH 76, SRRH 78, SRLR 86 and SRRR 90) independently under a situation where the SLA 64 is in the fully open state and the SLR 70 is in the fully closed state. Thus, the present system 100 controls the sum total of the braking force of the front wheels FL, FR and the braking force of the rear wheels RL, RR so that the proportion of the braking force of the front wheels and the rear wheels corresponds to an ideal distribution ratio. Hereinafter, a control for achieving the function discussed above is referred to as an ideal distribution control.

According to the ideal distribution control, it is possible to stop the vehicle stably. However, it is required to actuate the two-position solenoids of the brake actuator 24 frequently for executing the ideal distribution control. Thus, the ideal distribution control needs complex procedures and generates a loud operating sound.

Further, braking force exerted on the vehicle is rapidly reduced in some cases where the regenerative braking force is rapidly reduced during the ideal distribution control. In the system 10, the regenerative braking force is rapidly reduced following the change of the charging state of the battery 18 and rotational speed of the driving wheels. Therefore, the braking force exerted on the vehicle is rapidly reduced in some cases during the ideal distribution control. As discussed above, the ideal distribution control is not necessarily the best way to control the braking force of the vehicle.

The system 10 of the present embodiment controls the wheel cylinder pressure PW/C of the front wheels FL, FR and the rear wheels RL, RR to almost the same pressure instead of executing the ideal distribution control. Therefore, the system 10 provides durability and quiet operation without executing complex procedures. Further, the system 10 generates at least the target-hydraulic braking force even when the regenerative braking force is rapidly reduced.

Thus, the system 10 prevents the braking force exerted on the vehicle from decreasing to a value that is less than a required braking force of the driver.

The routine shown in FIG. 3 proceeds to step 212, when the driver executes a braking operation in a situation where the vehicle is turning.

As discussed above, the system 10 always adds the maximum regenerative braking force to the driving wheels when the vehicle is not turning, namely, when the vehicle traveling straight. In this case, the driving wheels generate enough longitudinal force. The lateral forces of the driving wheels decrease, as the longitudinal forces increase. Accordingly, it is not preferable always to add the maximum regenerative braking force to the driving wheels for increasing cornering characteristics of the vehicle.

In a case where the vehicle is traveling straight, stability of the vehicle is not adversely affected even when the driving wheels do not generate enough lateral force. However, in a case where the vehicle is turning, the lateral force that the driving wheels generate substantially affects the cornering stability. Thus, the system 10 controls the regenerative braking force to an appropriate force that is smaller than the maximum regenerative braking force when the vehicle is turning.

In the routine shown in FIG. 3, steps 212 and 214 are executed to provide the functions discussed above.

In step 212, the sum total of braking force that the driving wheels can generate is calculated based on turning status of the vehicle and speed of the vehicle. Hereinafter, the sum total is referred to as allowable braking force.

Figure 4:
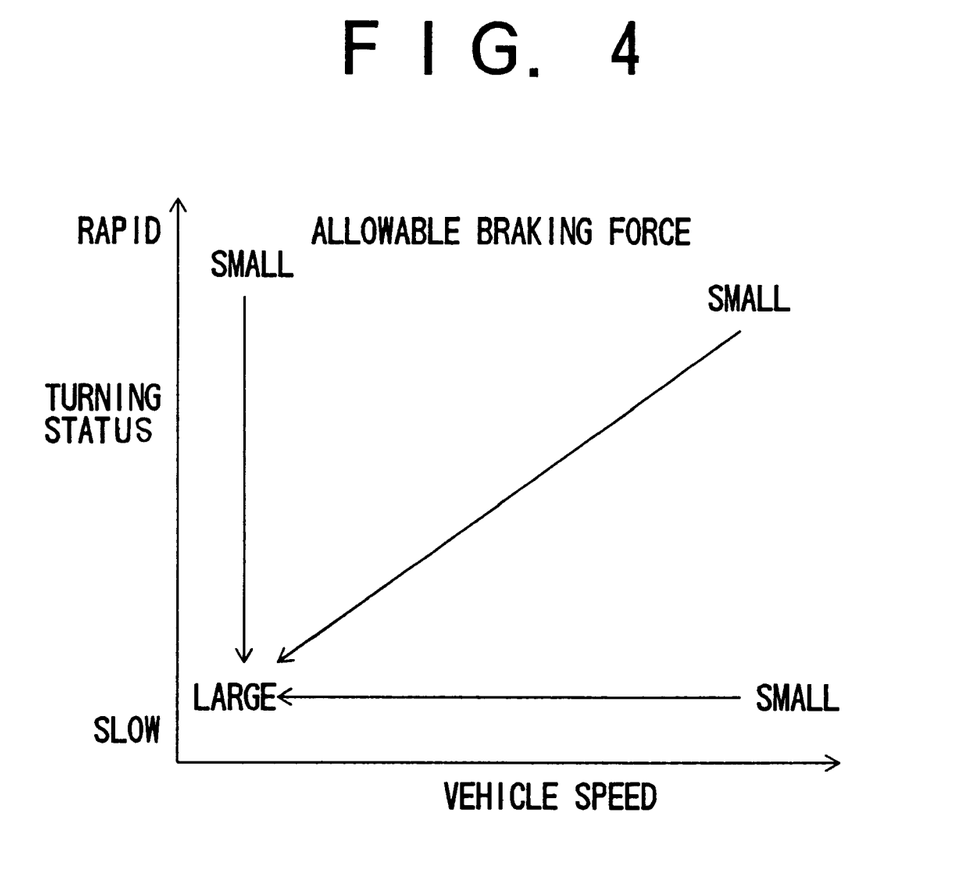
FIG. 4 is a map referred in the routine shown in FIG. 3.

FIG. 4 shows a two-dimensional map regarding the allowable braking force. The brake computer 22 memorizes the map shown in FIG. 4. The allowable braking force shown in the map is fixed experimentally so that the vehicle obtains a stable cornering state when the sum total of each of the FL and the FR corresponds to the allowable braking force.

In above step 212, the allowable braking force is determined by referring FIG. 4 based on the vehicle speed, which is calculated based on the rotational speed VWFL, VWFR, VWRL, VWRR, and the cornering state, which is detected based on the difference of rotational speed $\Delta VR=|VWRL-VWRR|$ OR $\Delta VF =|VWFL-VWFR|$. When step 212 is finished, the routine proceeds to step 214.

In step 214, the regenerative braking force that the system 10 can generate during the turning of the vehicle is calculated. In this step 214, the regenerative braking force is calculated by subtracting the target-hydraulic braking force calculated above in step 206 from the allowable braking force calculated above in step 212. When the calculation is finished, the routine will be finished after executing the procedures of step 216 and 218.

As discussed above, the allowable braking force is determined according to the cornering state of the vehicle. Further, the allowable braking force is determined so that it is adversely affected the cornering stability of the vehicle. Therefore, the system 10 of the present embodiment always gives the vehicle stable cornering stability regardless of the cornering state of the vehicle.

Moreover, according to the routine, the regenerative braking force is determined to be less when the vehicle is turning as compared to when the vehicle is traveling straight. The effects of the rapid reduction of the regenerative braking force decrease, as the regenerative braking force decreases. Therefore, the system 10 prevents substantial decrease of the cornering stability of the vehicle when the regenerative braking force is rapidly reduced while the vehicle is turning.

As discussed above, the system 10 gives the vehicle stable cornering stability when the regenerative braking force is appropriately generated and prevents substantial decrease of the cornering stability when the regenerative braking force is removed, hereby making the vehicle highly energy efficient.

Further, the present invention is not limited to these embodiments, but variations and modifications may be made without departing from the scope of the present invention.

What is claimed is:

1. A braking system for a vehicle comprising:
   a hydraulic braking unit that generates a hydraulic braking force;
   a regenerative braking unit that generates a regenerative braking force regenerating braking energy as regenerative electric power;
   a target-braking force detector that detects a target-braking force required by a driver;
   a turning detector that determines whether the vehicle is turning;
   a regenerative controller which, when the vehicle is not turning, sets the regenerative braking force to a first predetermined value and which, when the vehicle is turning, sets the regenerative braking force to a second predetermined value, the second predetermined value always being smaller than the first predetermined value; and
   a brake actuator that sets the hydraulic braking force to the target-braking force.

2. The braking system for a vehicle as claimed in claim 1, wherein:
   said turning detector comprising a first turn detector that detects turning status of the vehicle; and
   said regenerative controller reduces said second predetermined value as determined by an increase in a rate of turning of the vehicle.

3. The braking system for a vehicle as claimed in claim 1, wherein:
   said turning detector comprises a speed sensor that senses vehicle speed; and
   said regenerative controller reduces said second predetermined value, as the vehicle speed increases.

4. The braking system for a vehicle as claimed in claim 1, further comprising:
   a master cylinder that generates master cylinder pressure according to an amount of braking operation; and
   said target-braking force detector comprising a pressure sensor that senses said master cylinder pressure and a target calculator that calculates said target-braking force based on said master cylinder pressure.

5. The braking system for a vehicle as claimed in claim 1, further comprising:
   a first wheel speed sensor that senses rotational speed of a left side wheel;
   a second wheel speed sensor that senses rotational speed of a right side wheel; and
   said turning detector comprising a second turn detector that detects turning status of the vehicle based on a difference of said rotational speed of the left side wheel and the right side wheel.

6. The braking system for a vehicle as claimed in claim 1, wherein said first predetermined value is a maximum regenerative braking force that the regenerative braking unit can generate.

7. The braking system for a vehicle as claimed in claim 6, further comprising:
   a charging state detector that detects a charging state of a battery provided to the vehicle; and
   a first maximum value calculator that calculates said maximum regenerative braking force based on said charging state of the battery.

8. The braking system for a vehicle as claimed in claim 6, further comprising:
   a driving wheel speed sensor that detects wheel speed of driving wheels; and
   a second maximum value calculator that calculates said maximum regenerative braking force based on said wheel speed sensor of the driving wheels.

9. The braking system for a vehicle as claimed in claim 1, further comprising:
   an allowable value calculator that calculates an allowable braking force that driving wheels can generate without adverse effect on cornering stability of the vehicle; and
   a second value calculator that calculates said second predetermined value by subtracting said target-braking force from said allowable braking force.

10. The braking system for a vehicle as claimed in claim 9, wherein:
    said turning detector comprising a third turn detector that detects turning status of the vehicle; and
    said allowable value calculator calculates said allowable braking force based on the turning state of the vehicle.

11. The braking system for a vehicle as claimed in claim 9, wherein:
    said turning detector comprises a speed sensor that senses vehicle speed; and
    said allowable value calculator calculates said allowable braking force based on the vehicle speed.

12. The braking system for a vehicle as claimed in claim 1, wherein:
    said hydraulic braking unit generates said hydraulic braking force on each wheel of the vehicle.

13. The braking system for a vehicle as claimed in claim 1, wherein:
    said regenerative braking unit generates said regenerative braking force on driving wheels of the vehicle.

14. The braking system for a vehicle as claimed in claim 1, wherein said regenerative braking unit comprising a motor that generates driving torque supplied to driving wheels and regenerates rotate energy of the driving wheels as regenerative electric power.

15. A braking system for a vehicle, comprising:
    a hydraulic braking unit including a fluid pressure generator, a valve which disconnects a wheel cylinder from a master cylinder at least when a braking operation is being performed, and a hydraulic brake controller that controls a brake fluid pressure supplied to the wheel cylinder in accordance with a brake operation using the fluid pressure generator as a fluid pressure source;
    a regenerative braking unit that generates a regenerative braking force regenerating braking energy as regenerative electric power;
    a turning detector that determines whether the vehicle is turning;
    a regenerative controller which, when the vehicle is not turning, sets the regenerative braking force to a first predetermined value and which, when the vehicle is turning, sets the regenerative braking force to a second predetermined value, the second predetermined value always being smaller than the first predetermined value; and a brake controller that sets a total braking force acting on the vehicle as a sum of the regenerative braking force and a hydraulic braking force generated in accordance with the fluid pressure supplied to the wheel cylinder.

16. A braking system according to claim 15, wherein the turning detector comprises a first turn detector that detects a turning status of the vehicle and wherein the regenerative controller reduces the second predetermined value based on an increase in a rate of turning of the vehicle.

17. A braking system according to claim 15, wherein the turning detector comprises a speed detector that detects a vehicle speed and wherein the regenerative controller reduces the second predetermined value as the vehicle speed increases.

18. A braking system according to claim 15, further comprising:

a first wheel speed sensor that senses a rotational speed of a left side wheel of the vehicle;

a second wheel speed sensor that senses a rotational speed of a right side wheel of the vehicle; and wherein the turning detector detects a turning status of the vehicle based on a difference between the rotational speeds of the right and left side wheels.

19. A braking system according to claim 15, wherein the first predetermined value is a maximum regenerative braking force that the regenerative braking unit can generate.

20. A braking system according to claim 19, further comprising:

a driving wheel speed sensor that senses a rotational speed of a driving wheel of the vehicle;

a maximum value calculator that calculates the maximum regenerative braking force based on the rotational speed of the driving wheel.

21. A braking system according to claim 15, further comprising:

a charging state detector that detects a charging state of a battery provided in the vehicle; and a maximum value calculator that calculates the maximum regenerative braking force based on the charging state of the battery.

22. A braking system according to claim 15, wherein the hydraulic braking unit applies the hydraulic braking force to each wheel of the vehicle.

23. A braking system according to claim 15, wherein the regenerative braking unit applies the regenerative braking force to a driving wheel of the vehicle.

24. A braking system according to claim 15, wherein the regenerative braking unit comprises a motor that generates driving torque supplied to a driving wheel of the vehicle and regenerates rotational energy of the driving wheels as regenerative electric power.

* * * * *

UNITED STATES PATENT AND TRADEMARK OFFICE
CERTIFICATE OF CORRECTION

PATENT NO. : 6,070,953
DATED : June 6, 2000
INVENTOR(S) : Shouichi MIYAGO

It is certified that error appears in the above-identified patent and that said Letters Patent is hereby corrected as shown below:

Column 2, line 3, change "proportion" to --proportional--.

Column 3, line 64, delete ", on the".

Column 5, line 54, change "rapid" to --rapidly--.

Column 5, line 57, delete "where" at beginning of line.

Column 5, line 60, delete "where".

Column 6, line 6, change "output" to --outputs--.

Column 6, line 10, change "output" to --outputs--.

Column 6, line 15, change "output" to --outputs--.

Column 10, line 9, after "vehicle" at end of line insert --is--.

Column 10, line 39, insert "to" before "FIG. 4".

Signed and Sealed this

Eighth Day of May, 2001

*Attest:*

NICHOLAS P. GODICI

*Attesting Officer*     *Acting Director of the United States Patent and Trademark Office*